March 2, 1943.  R. B. CAMPBELL  2,312,686
EMERGENCY CUT-OVER VALVE
Filed Sept. 24, 1941

INVENTOR
RODNEY B. CAMPBELL
BY HARRIS, KIECH, FOSTER & HARRIS
FOR THE FIRM
ATTORNEYS.

Patented Mar. 2, 1943

2,312,686

UNITED STATES PATENT OFFICE 2,312,686

EMERGENCY CUT-OVER VALVE

Rodney B. Campbell, North Hollywood, Calif., assignor to John Eley, Jr., Los Angeles, Calif.

Application September 24, 1941, Serial No. 412,117

2 Claims. (Cl. 277—21)

My invention relates to a fluid valve and more particularly to a valve device adapted to permit fluid to be supplied to a discharge line from either of two sources.

My invention is of particular utility in hydraulic control systems for aircraft and will be described in connection therewith, although it will be recognized that my device may be used in other connections, and, consequently, I do not wish to be limited to the particular use or construction described.

In the aircraft industry it is standard practice to provide a hydraulic system for operating many of the operating devices of an airplane, such as, for example, the device for elevating and lowering the landing gear. In such hydraulic systems an operating fluid, such as a light oil, is ordinarily used under relatively high pressures, frequently in the neighborhood of 1000 pounds per square inch or higher. The operating fluid is usually conveyed to the operating equipment by an engine driven high-pressure pump, and frequently the piping conveying the operating fluid from the pump is quite lengthy. As a safety measure, in such hydraulic control systems it is generally required that a manually operable hand pump be included in the system so that if the high-pressure engine pump breaks down, or if the piping leading from it to the operating equipment be shot away by enemy action, the equipment may still be operated by the hand pump. Since the hand pump is only normally used in an emergency, valve means must be provided which will normally permit a free flow of operating fluid from the engine driven pump to the operating equipment but which is operable to close fluid communication between the engine driven pump and the equipment and open fluid communication between the hand pump and such equipment. It is a primary object of my invention to provide such a valve means.

Another object of my invention is to provide such a valve means in which the valve member thereof is operated by pressure supplied by the hand pump.

A further object of the invention is to provide such a valve means in which fluid communication is first cut off between the main source of fluid supply and the outlet system and then fluid communication is opened between the auxiliary source of fluid supply and the outlet system.

Other objects and advantages will appear from the following specification and the drawing, which is for the purpose of illustration only, and in which.

Figure 1:
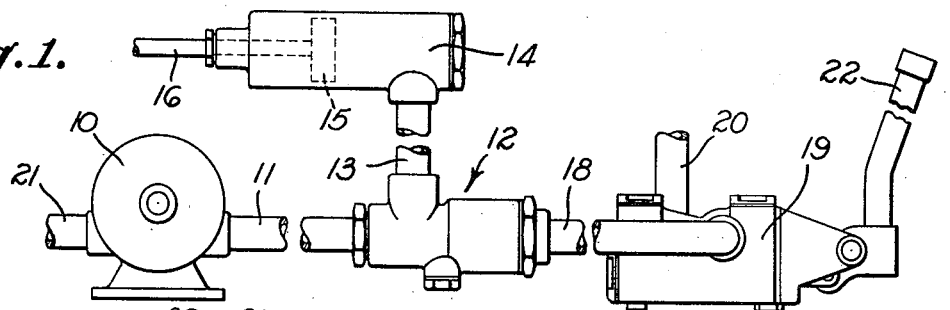
Fig. 1 is a diagrammatic assembly view of the invention installed in a hydraulic control system.

Referring to Fig. 1 of the drawing, I diagrammatically show a hydraulic system including a high pressure fluid pump 10, the pressure discharge side of which is connected by piping 11 with the valve device 12 of my invention. The valve device 12 is connected by piping 13 with a hydraulic cylinder 14 having a piston 15 therein to which is connected a piston rod 16, as is well known in the art. Also connected to the valve device 12 is an auxiliary supply pipe 18 leading from a hand pump 19, which in turn is connected by piping 20 with a suitable source of operating fluid (not shown). As will be understood, the fluid pump 10 is also connected by piping 21 with a suitable source of operating fluid (not shown), which may, if desired, be common to the piping 20. The fluid pump 10, the hydraulic cylinder 14, and the hand pump 19 are all standard equipment well known in the art, and are not described in detail herein, the fluid pump 10 being of any desired construction capable of supplying fluid under high pressure through the valve device 12 to the hydraulic cylinder 14 to actuate the piston 15 therein, and the hand pump 19 similarly being of any desired construction and adapted to be manually operated by means of a hand lever 22 to similarly supply operating fluid under high pressure through the valve device 12 to the hydraulic cylinder 14 as desired, the operation of the valve device 12 being described in detail hereinafter.

The valve device 12, which comprises my present invention, includes a tubular housing 24 having a longitudinal bore 25 therethrough which is provided at one end with a threaded counterbore 26 adapted to receive an externally threaded inlet plug 27 forming the main inlet of the valve device 12 and being internally threaded to receive the main inlet pipe 11. The other end of the longitudinal bore 25 is provided with a counterbore 28, the outer end of which is internally threaded to receive an auxiliary inlet plug 30 which forms an auxiliary inlet for the valve device 12 and which is internally threaded to receive one end of the auxiliary supply pipe 18. Formed on the housing 24 is a boss 31 having an internally threaded bore 32 which communicates through an opening 33 with the longitudinal bore 25, and which forms an outlet for the valve device 12, the bore 32 being adapted to threadedly receive one end of the piping 13.

Disposed in the longitudinal bore 25 is a tubular liner 34 having a flange 36 at one end thereof which abuts against a shoulder 37 formed at the inner end of the counterbore 26, the tubular liner being held rigidly in place by the main inlet plug 27 which is separated therefrom by an annular main valve seat member 38. The tubular liner 34 is provided with a radial opening 39 which registers with the opening 33 to provide communication between the interior of the liner and the outlet piping 13.

Slidably disposed in the tubular liner 34 and making a relatively fluid-tight fit therein is a main valve member 41 which is sealed relative to the tubular housing 24 by a chevron packing unit 42 disposed in the inner end of the counterbore 28 and clamped therein by the auxiliary inlet plug 30. The main valve member 41 is tubular in form, being provided with an axial bore 43 therethrough which communicates at its inner end through radial openings 44 with a space 45 between the tubular liner 34 and the inner end of the main valve member which is of reduced diameter, forming a valve head 47 provided with an annular beveled valve face 48 formed thereon. The outer end of the main valve member 41 is provided with a threaded counterbore 49 forming a shoulder 50 on which an annular auxiliary valve seat member 51 is held by an externally threaded annular ring 54 which is threaded into the counterbore 49. The valve seat member 51 is provided with a conical auxiliary valve seat 55 on which a ball valve member 56 is normally held in seating engagement by a freely movable seating head 57 maintained in pressure engagement with the ball valve member by a compression spring 58 disposed in the axial bore 43.

In the periphery of the main valve member 41 is formed an annular detent groove 60 which is adapted to receive a ball detent element 61 which is adapted to move through the tubular liner 34 through an opening 62 formed therein and through a cylindrical guide opening 63 formed in the tubular housing 24, the ball detent element 61 normally being urged inwardly by a detent spring 64 held under compression by a screw plug 65 threaded into a threaded detent opening 66 in the tubular housing 24.

Figure 2:
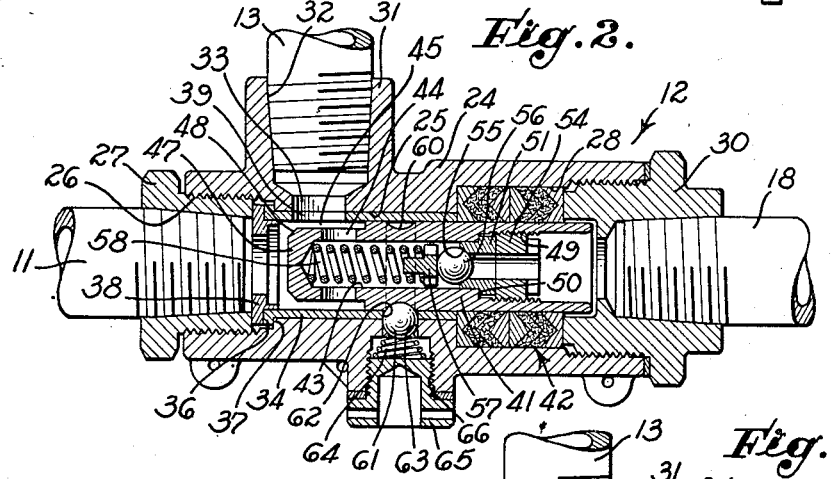
Fig. 2 is a longitudinal sectional view taken through my invention.

In the preferred use of the invention, as described, the parts of the valve device 12 are normally in the position shown in Fig. 2, in which fluid pressure is relatively low in the auxiliary inlet formed by the auxiliary inlet plug 30 and fluid pressure in the main inlet formed by the main inlet plug 27 is relatively high. As will be noted, in this position the main valve member 41 is in its open position, having moved to the right away from the main valve seat member 38 under the action of the relatively high fluid pressure in the main inlet plug 27. In this position, the ball detent element 61 is moved inwardly by the detent spring 64 into the detent groove 60 so as to retain the main valve member in this position and prevent it from moving therefrom. In this open position of the main valve member 41, as will be noted, operating fluid can freely flow from the main inlet pipe 11 through the main valve seat member 38, the space 45 around the valve head 47, the radial opening 39, and the opening 33 into the outlet piping 13, through which it is conveyed to the hydraulic cylinder 14 to actuate the piston 15 therein, thus causing the piston rod 16 to move as desired. If the hydraulic system diagrammatically shown in Fig. 1 is used in an airplane, as is preferably the case, the piston rod 16 may be used to mechanically raise or lower the landing gear of the plane, or for any other mechanical function required. If, due to structural failure or damage, the pump 10 fails to operate or the main inlet pipe 11 develops a leak such that operating fluid cannot be conveyed by the pump 10 to the hydraulic cylinder 14, manual actuation of the hand lever 22 of the hand pump 19 causes the hand pump to supply operating fluid under suitable pressure through the auxiliary supply pipe 18 to the valve device 12.

Figure 3:
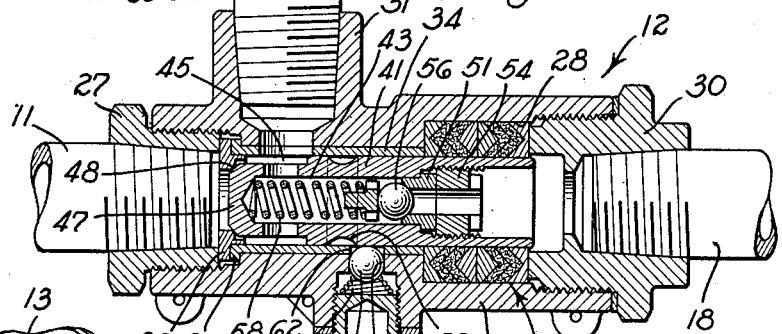
Fig. 3 is a view similar to Fig. 2 but illustrating a second position of operation of the parts.

Under these conditions, operating fluid flows from the auxiliary supply pipe 18 through the auxiliary inlet plug 30, thus exerting a force on the right end of the main valve member 41 tending to move the main valve member to the left from the position shown in Fig. 2 to the position shown in Fig. 3. The compression on the compression spring 58 is relatively high so that the ball valve member 56 remains seated on the auxiliary valve seat 55 during the movement of the main valve member 41 from the position shown in Fig. 2 to that shown in Fig. 3.

When the main valve member 41 has moved to the left from the position shown in Fig. 2 to that shown in Fig. 3, the beveled valve face 48 on the valve head 47 thereof seats on the main valve seat member 38 to close fluid communication between the main inlet plug 27 and the outlet piping 13. As will be understood, as the main valve member 41 moves to the left from the position shown in Fig. 2 to that shown in Fig. 3 the ball detent element 61 is forced outwardly in the guide opening 63 to compress the detent spring 64.

Figure 4:
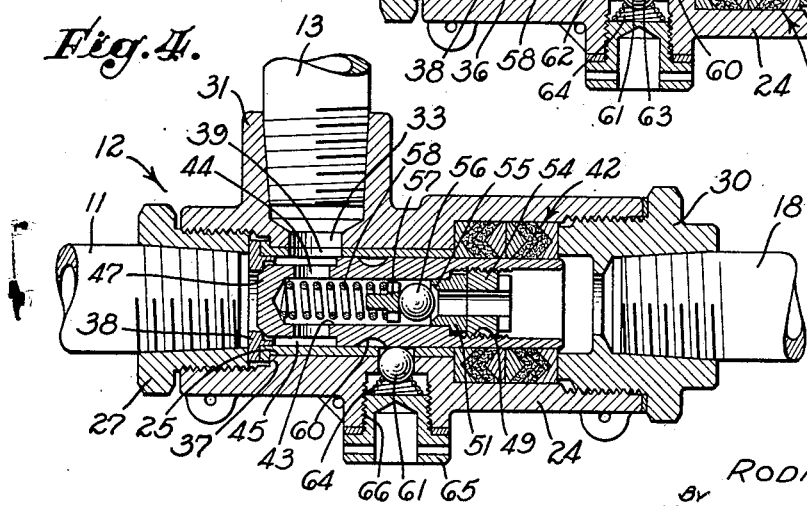
Fig. 4 is a view similar to Fig. 2 but illustrating a third position of operation of the parts.

As soon as the main valve member 41 seats on the main valve seat member 38, fluid pressure from the auxiliary supply pipe 18 is delivered through the annular ring 54 and the annular auxiliary valve seat member 51 against the ball valve member 56, moving the ball valve member off the auxiliary valve seat 55 against the action of the compression spring 58, to the position shown in Fig. 4. Operating fluid can then flow from the auxiliary supply pipe 18 through the axial bore 43 and the radial openings 44 in to the space 45, from whence it flows into the outlet piping 13 and is delivered to the hydraulic cylinder 14 to operate the piston 15 therein. It will thus be appreciated that my valve device 12 provides a means whereby an auxiliary source of fluid under pressure may be cut into a pressure supply line, preferably upon the failure of the main source of pressure fluid, so that the device to be operated by the pressure fluid may none the less be operated as desired. It is also to be noted that as soon as operating fluid under pressure is again delivered through the main inlet pipe 11 to the valve device 12, if the pressure thereof is higher than that developed by the hand pump 19, it will exert a force on the left end of the valve head 47 tending to move the main valve member 41 from the position shown in Fig. 4 to that shown in Fig. 2. When this occurs, normal operation of the valve device will be resumed, in which operating fluid will be supplied from the main inlet pipe 11 through the valve device 12 to the outlet piping 13.

The particular design and cooperation of the parts of the valve device 12 are important features of the invention, as they provide for simplicity of assembly, installation, and repair of the valve device. In this connection, it will be noted that all of the insertable stationary parts of the valve device 12, such as the tubular liner 34 and the chevron packing unit 42, are rigidly clamped in place yet are readily removable from or insertable into the tubular housing 24. Similarly, the main valve member may be readily removed from the valve device by unscrewing the auxiliary inlet plug 30, which permits removal of the main valve member and the auxiliary valve means comprised of the ball valve member 56 and its associated parts. Also, by unscrewing the screw plug 65, the ball detent element 61 and its associated parts may be readily removed for replacement or repair.

Although I have shown and described a preferred embodiment and use of my invention, it will be understood that I do not intend to be limited thereby, as certain parts and elements thereof may readily be replaced by others having the same function and method of operation, and therefore I desire to be afforded the full scope of the following claims.

I claim as my invention:

1. In a valve device, the combination of: a housing having a longitudinal bore therein and having an outlet at one side thereof communicating with said bore; a sleeve in said bore and having a port registering with said outlet; an annular valve seat member abutting against one end of said sleeve; a first closure member closing one end of said bore and abutting against said valve seat member, said closure member having a main inlet adapted to be connected to a main source of fluid under pressure; an annular packing member in said bore and abutting against the other end of said sleeve, the internal diameter of said packing member being substantially the same as the internal diameter of said sleeve; a second closure member closing the other end of said bore and abutting against said packing member, said second closure member having an auxiliary inlet adapted to be connected to an auxiliary source of fluid under pressure; and a piston member axially movable in said bore and having a valve head adapted to seat on said annular valve seat to close fluid communication therethrough, said piston member also having a spring-held check valve adapted to permit a flow of fluid from said auxiliary inlet to said outlet but preventing a reverse flow.

2. In a valve device, the combination of: a housing having longitudinal bore therein and having an outlet at one side thereof communicating with said bore; a sleeve in said bore and having a port registering with said outlet; an annular valve seat member abutting against one end of said sleeve; a first closure member closing one end of said bore and abutting against said valve seat member, said closure member having a main inlet adapted to be connected to a main source of fluid under pressure; an annular packing member in said bore and abutting against the other end of said sleeve, the internal diameter of said packing member being substantially the same as the internal diameter of said sleeve; a second closure member closing the other end of said bore and abutting against said packing member, said second closure member having an auxiliary inlet adapted to be connected to an auxiliary source of fluid under pressure; a piston member axially movable in said bore and having a valve head adapted to seat on said annular valve seat to close fluid communication therethrough, said piston member also having a spring-held check valve adapted to permit a flow of fluid from said auxiliary inlet to said outlet but preventing a reverse flow; and means for yieldably restraining said piston member against axial movement toward said annular valve seat.

RODNEY B. CAMPBELL.